(12) United States Patent
Tajika et al.

(10) Patent No.: US 11,097,987 B2
(45) Date of Patent: Aug. 24, 2021

(54) PRODUCTION METHOD OF CALCIUM CARBONATE POROUS SINTERED BODY

(71) Applicant: SHIRAISHI CENTRAL LABORATORIES CO. LTD., Amagasaki (JP)

(72) Inventors: Masahiko Tajika, Amagasaki (JP); Shota Umemoto, Amagasaki (JP); Shunzo Shimai, Togane (JP)

(73) Assignee: SHIRAISHI CENTRAL LABORATORIES CO. LTD., Amagasaki (JP)

( * ) Notice: Subject to any disclaimer, the term of this patent is extended or adjusted under 35 U.S.C. 154(b) by 24 days.

(21) Appl. No.: 16/487,530

(22) PCT Filed: Feb. 26, 2018

(86) PCT No.: PCT/JP2018/006924
§ 371 (c)(1),
(2) Date: Aug. 21, 2019

(87) PCT Pub. No.: WO2018/155681
PCT Pub. Date: Aug. 30, 2018

(65) Prior Publication Data
US 2020/0055783 A1  Feb. 20, 2020

(30) Foreign Application Priority Data
Feb. 27, 2017 (JP) .............. JP2017-035244

(51) Int. Cl.
*C04B 38/10* (2006.01)
*C01F 11/18* (2006.01)
*C04B 35/00* (2006.01)

(52) U.S. Cl.
CPC .............. *C04B 38/10* (2013.01); *C01F 11/18* (2013.01); *C04B 35/00* (2013.01);
(Continued)

(58) Field of Classification Search
CPC ....... C04B 35/057; C04B 35/64; C04B 38/10; C04B 38/00; C04B 2235/3208
See application file for complete search history.

(56) References Cited

U.S. PATENT DOCUMENTS

| 4,124,688 A | 11/1978 | Shibazaki et al. |
| 2008/0312064 A1 | 12/2008 | His et al. |

(Continued)

FOREIGN PATENT DOCUMENTS

| CN | 101014551 A | 8/2007 |
| DE | 19507309 A1 | 9/1995 |

(Continued)

OTHER PUBLICATIONS

Tomatsuri et al., "Effect of Starting Materials on Liquid Phase Sintering of Calcium Carbonate", Proceedings for the Academic Conference of the Society of Inorganic Materials, Japan, Nov. 14, 2002, vol. 105, pp. 46-47, cited in Specification (2 pages).

(Continued)

*Primary Examiner* — Noah S Wiese
(74) *Attorney, Agent, or Firm* — Westerman, Hattori, Daniels and Adrian, LLP

(57) ABSTRACT

Provided is a production method that can easily produce a calcium carbonate porous sintered body. The production method includes the steps of: preparing a dispersion liquid containing calcium carbonate and a gelling agent; adding a foaming agent to the dispersion liquid, followed by stirring until foamy to make a foam; turning the foam into a gel; and sintering the gelled foam to produce a calcium carbonate porous sintered body.

10 Claims, 2 Drawing Sheets

(52) U.S. Cl.
CPC ...... *C01P 2004/04* (2013.01); *C01P 2004/60* (2013.01); *C01P 2006/12* (2013.01); *C04B 2235/661* (2013.01)

(56) References Cited

U.S. PATENT DOCUMENTS

| | | | |
|---|---|---|---|
| 2009/0069167 A1 | | 3/2009 | Tardivat et al. |
| 2013/0224421 A1* | | 8/2013 | Kamei .................. C04B 35/04 428/64.1 |
| 2018/0237300 A1 | | 8/2018 | Sakai et al. |

FOREIGN PATENT DOCUMENTS

| | | | |
|---|---|---|---|
| JP | 54-28397 | B2 | 9/1979 |
| JP | 62-36021 | A | 2/1987 |
| JP | 4-231367 | A | 8/1992 |
| JP | 5-310469 | A | 11/1993 |
| JP | 8-198623 | A | 8/1996 |
| JP | 2007063085 | A | 3/2007 |
| JP | 2007-254240 | A | 10/2007 |
| JP | 2011-251886 | A | 12/2011 |
| JP | 2012-240872 | A | 12/2012 |
| WO | 2017/038360 | A1 | 3/2017 |

OTHER PUBLICATIONS

International Search Report dated May 15, 2018, issued in counterpart International Application No. PCT/JP2018/006924 (2 pages).
Notification of Transmittal of Translation of the International Preliminary Report on Patentability (Form PCT/IB/338) issued in counterpart International Application No. PCT/JP2018/006924 dated Sep. 6, 2019 with Forms PCT/IB/373 and PCT/ISA/237. (6 pages).
Extended European Search Report, dated Dec. 4, 2020, issued in counterpart European Application No. 18757707.7 (in English; 7 pages).
Office Action dated Jun. 3, 2021, issued in counterpart Chinese Application No. 201880013713.08 (17 pages; w/English machine translation).

* cited by examiner

[FIG. 1]
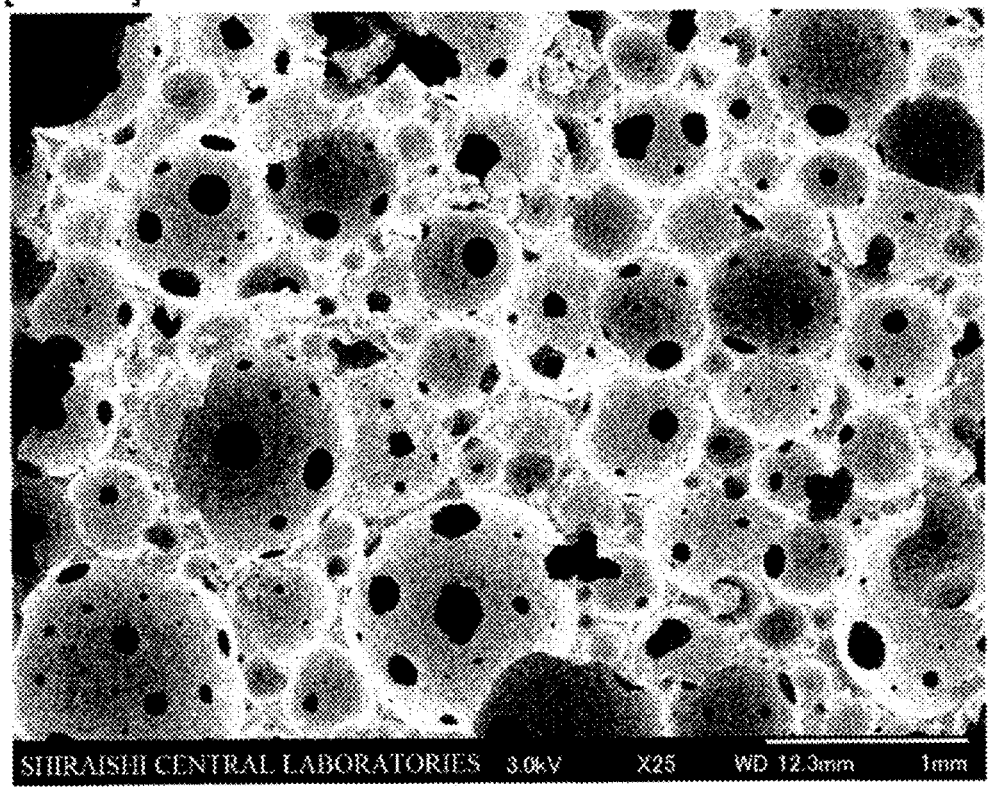
[FIG. 2]
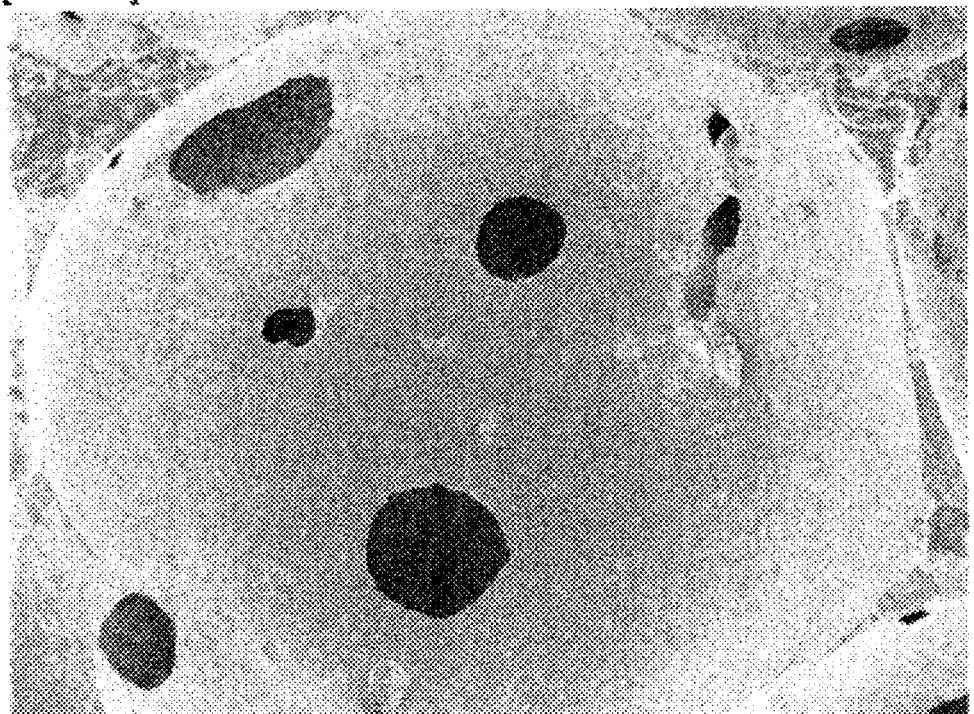

[FIG. 3]
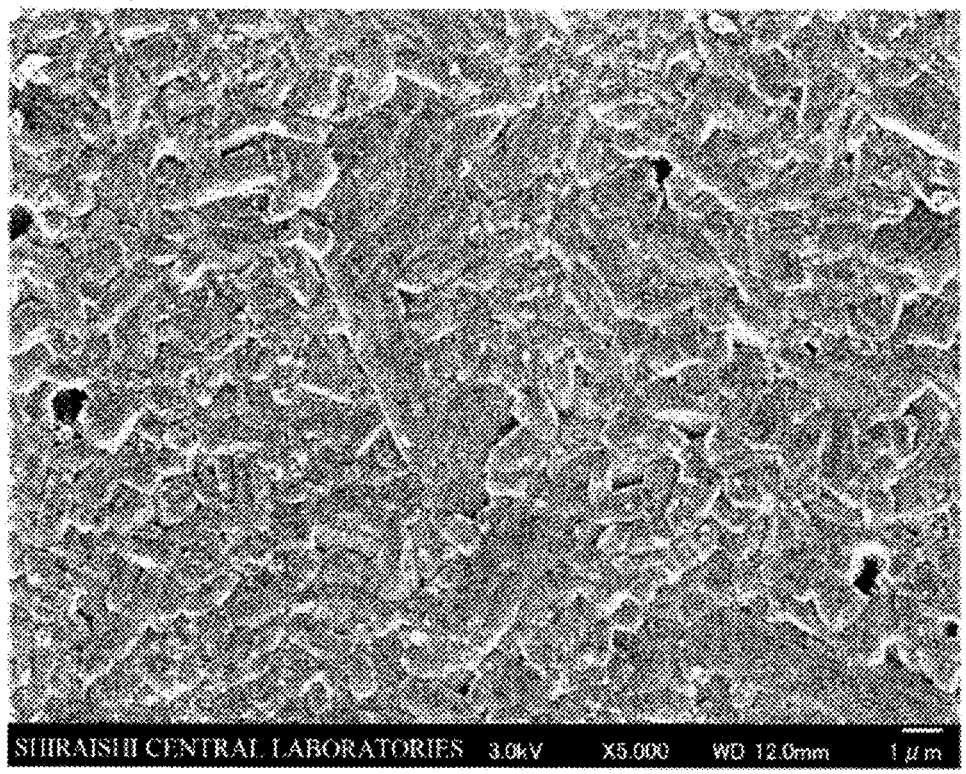
[FIG. 4]
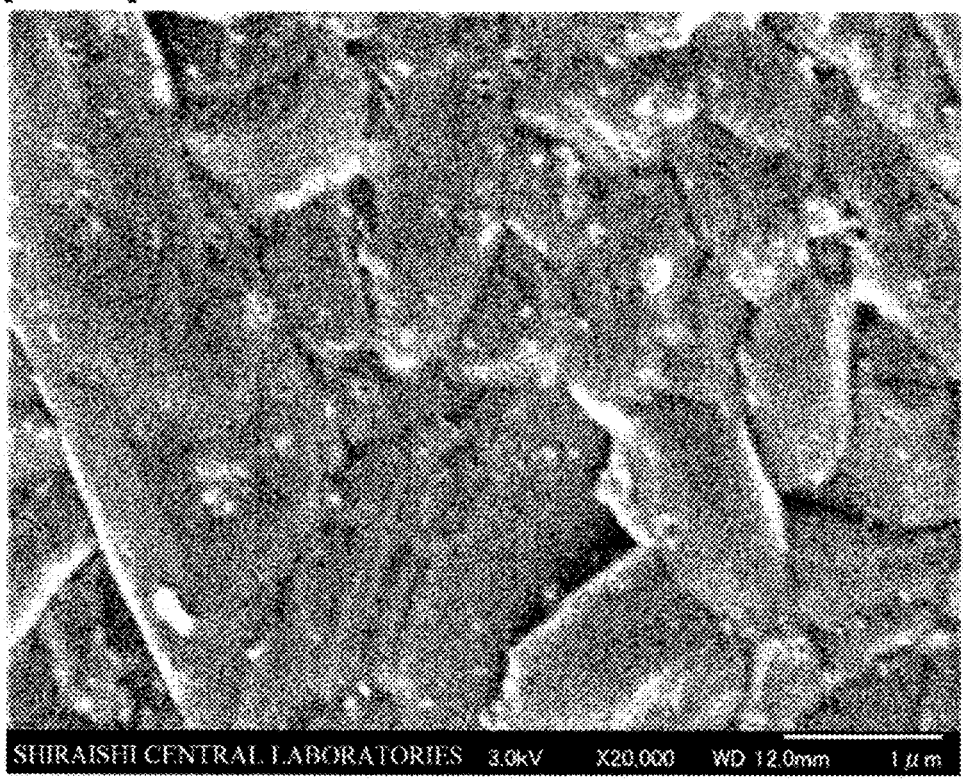

PRODUCTION METHOD OF CALCIUM CARBONATE POROUS SINTERED BODY

TECHNICAL FIELD

The present invention relates to methods for producing a calcium carbonate porous sintered body.

BACKGROUND ART

A calcium carbonate sintered body is expected to be applied to a growth nucleus for an artificial pearl, a biological body, and so on, and various studies have been done on its production method. In conventional methods for producing a calcium carbonate sintered body, generally, a calcium carbonate sintered body is produced by isostatically pressing a mixture of calcium carbonate and a sintering aid into a green body and sintering this green body in a carbon dioxide atmosphere (see Patent Literature 1 and Non-Patent Literature 1).

CITATION LIST

Patent Literature

Patent Literature 1: JP-A-2007-254240

Non-Patent Literature

Non-Patent Literature 1: Satoko Tomatsuri et al., "Tansan Karushiumu no Shoketsu niokeru Shuppatsu Busshitsu no Eikyo", Proceedings for the Academic Conference of the Society of Inorganic Materials, Japan, Vol. 105th, p. 46-47 (Nov. 14, 2002)

SUMMARY OF INVENTION

Technical Problem

When a calcium carbonate sintered body is made porous, the calcium carbonate sintered body can be increased in surface area and thus can be a calcium carbonate sintered body useful for various applications, such as biological application. From this viewpoint, there has heretofore been a demand for a method that can easily produce a calcium carbonate porous sintered body.

An object of the present invention is to provide a production method that can easily produce a calcium carbonate porous sintered body.

Solution to Problem

A production method according to the present invention includes the steps of: preparing a dispersion liquid containing calcium carbonate and a gelling agent; adding a foaming agent to the dispersion liquid, followed by stirring until foamy to make a foam; turning the foam into a gel; and sintering the gelled foam to produce a calcium carbonate porous sintered body.

In the present invention, the dispersion liquid may contain a sintering aid. In this case, examples of the sintering aid include those containing carbonates or fluorides of at least two of lithium, sodium, and potassium and having a melting point of 600° C. or below.

The dispersion liquid preferably contains calcium carbonate in an amount of 20% by volume or more.

The step of sintering is preferably the step of performing presintering and then performing final sintering.

The temperature of the presintering is preferably in a range of 200 to 500° C. and the temperature of the final sintering is preferably equal to or greater than the temperature of the presintering and in a range of 420 to 600° C.

For example, calcium carbonate to be preferably used is one having an average particle diameter ($D_{50}$) in a range of 0.05 to 0.30 μm in a particle diameter distribution measured by transmission electron microscope observation. The BET specific surface area of calcium carbonate is preferably 5 to 25 m²/g.

In the present invention, the purity of calcium carbonate may be 99.9% by mass or more. With the use of high-purity calcium carbonate containing less impurities, a porous sintered body can be made without adding any sintering aid. The purity of calcium carbonate in this case is preferably 99.9% by mass or more and more preferably 99.99% by mass or more.

Calcium carbonate for producing a calcium carbonate porous sintered body according to the present invention has a purity of 99.9% by mass or more.

Advantageous Effects of Invention

The present invention can easily produce a calcium carbonate porous sintered body.

BRIEF DESCRIPTION OF DRAWINGS

FIG. 1 is a scanning electron micrograph (at 25-fold magnification) showing a calcium carbonate porous sintered body of Example 1.

FIG. 2 is a scanning electron micrograph (at 150-fold magnification) showing the calcium carbonate porous sintered body of Example 1.

FIG. 3 is a scanning electron micrograph (at 5000-fold magnification) showing the calcium carbonate porous sintered body of Example 1.

FIG. 4 is a scanning electron micrograph (at 20000-fold magnification) showing the calcium carbonate porous sintered body of Example 1.

DESCRIPTION OF EMBODIMENTS

Hereinafter, a description will be given of a preferred embodiment. However, the following embodiment is merely illustrative and the present invention is not limited to the following embodiment.

(Calcium Carbonate)

No particular limitation is placed on the type of calcium carbonate for use in the present invention so long as it can be used for production of a calcium carbonate porous sintered body. From the viewpoint of capable of making a porous sintered body with a dense wall, preferred calcium carbonate is one having an average particle diameter ($D_{50}$) in a range of 0.05 to 0.30 μm in a particle diameter distribution measured by transmission electron microscope observation.

The average particle diameter ($D_{50}$) in the particle diameter distribution measured by transmission electron microscope observation is preferably in a range of 0.05 to 0.30 μm, more preferably in a range of 0.08 to 0.25 μm, and still more preferably in a range of 0.10 to 0.20 μm. When the average particle diameter ($D_{50}$) is in the above range, a porous sintered body with a dense wall can be produced. The particle diameter distribution by transmission electron microscope observation can be obtained by measuring 1000 or more particles of calcium carbonate, which is an object to be measured, by transmission electron microscope observation.

Calcium carbonate for use in the present invention can be produced, for example, by a commonly well-known carbon dioxide synthesis method of blowing carbon dioxide into lime milk to react them each other. Particularly, as for particles having an average particle diameter ($D_{50}$) exceeding 0.1 μm, they can be produced according to a production method disclosed in Japanese Patent No. 0995926.

The BET specific surface area of calcium carbonate for use in the present invention is preferably 5 to 25 $m^2/g$, more preferably 7 to 20 $m^2/g$, and still more preferably 8 to 15 $m^2/g$. When the BET specific surface area is in the above range, the sinterability of calcium carbonate can be increased. Therefore, a porous sintered body with a dense wall can be produced.

The purity of calcium carbonate for use in the present invention is preferably 99.0% by mass or more, more preferably 99.5% by mass or more, and still more preferably 99.6% by mass or more.

In the present invention, high-purity calcium carbonate having a purity of 99.7% by mass or more can be used. With the use of high-purity calcium carbonate, the amount of sintering aid necessary for sintering can be small. Alternatively, calcium carbonate can be sintered without using any sintering aid. In this relation, calcium carbonate is preferably one having a purity of 99.8% by mass or more, more preferably one having a purity of 99.9% by mass or more, and still more preferably one having a purity of 99.95% by mass or more. Such high-purity calcium carbonate can be produced, for example, by the method disclosed in Japanese Patent Application Gazette No. 2012-240872.

Although no particular limitation is placed on the upper limit of the purity of high-purity calcium carbonate, it is generally 99.9999% by mass.

(Sintering Aid)

Any sintering aid can be used in the present invention without any particular limitation so long as it enables sintering of calcium carbonate to produce a porous sintered body. Examples of the sintering aid include those containing carbonates of at least two of lithium, sodium, and potassium and having a melting point of 600° C. or below. The melting point of the sintering aid is preferably 550° C. or below, more preferably 530° C. or below, and still more preferably in a range of 450 to 520° C. When the melting point of the sintering aid is in the above range, calcium carbonate can be fired at a lower temperature to produce a calcium carbonate porous sintered body. Because in the sintering the sintering aid is used by addition to calcium carbonate, the actual melting point becomes lower than the above temperature and, therefore, it sufficiently acts as a sintering aid. The sintering aid is preferably a mixture of potassium carbonate and lithium carbonate. For example, the melting point of the sintering aid can be determined from a phase diagram or can be measured by differential thermal analysis (DTA).

Alternatively, other examples of the sintering aid include those containing fluorides of at least two of lithium, sodium, and potassium and having a melting point of 600° C. or below. Such sintering aids also preferably have the above range of melting points. Examples of such sintering aids include mixtures of potassium fluoride, lithium fluoride, and sodium fluoride. Specifically, examples include mixtures having a composition range of 10 to 60% by mole potassium fluoride, 30 to 60% by mole lithium fluoride, and 0 to 30% by mole sodium fluoride. Within the above range, calcium carbonate can be fired at a lower temperature and a calcium carbonate porous sintered body with a dense wall can be produced.

The content of the sintering aid is, relative to the total amount of calcium carbonate and the sintering aid, preferably in a range of 0.1 to 3.0% by mass, more preferably in a range of 0.2 to 2.5% by mass, and still more preferably in a range of 0.3 to 2.0% by mass. If the content of the sintering aid is too small, calcium carbonate may not sufficiently be sintered. If the content of the sintering aid is too large, the density of the wall of the calcium carbonate porous sintered body may not be able to be increased.

(Gelling Agent)

The dispersion liquid in the present invention contains a gelling agent. When the dispersion liquid contains a gelling agent, the strength of bubbles in a dispersion foam obtained after foaming can be increased to stabilize the shape of the foam. Examples of the gelling agent include polysaccharides, such as methylcellulose, and alkaline water-soluble copolymers of isobutylene and maleic anhydride.

The content of the gelling agent in the dispersion liquid is preferably in a range of 0.1 to 5 parts by mass and more preferably in a range of 0.5 to 3 parts by mass relative to 100 parts by mass of calcium carbonate. If the content of the gelling agent is too small, the strength of bubbles in the foam may not increase, so that the shape of the foam may not be able to be stabilized. If the content of the gelling agent is too large, the above effect proportional to the content thereof may not be able to be achieved.

(Dispersion Liquid)

In the present invention, calcium carbonate is preferably dispersed into a dispersion medium, such as water, using a device having a high stirring force, such as a disperser, a mixer or a ball mill, with gradual addition of calcium carbonate into the dispersion medium. When the sintering aid is necessary, it is generally added into the dispersion liquid. The content of calcium carbonate is generally preferably 30 to 70% by mass in the dispersion liquid. In doing so, if necessary, about 0 to about 3 parts by mass of polymeric surfactant, such as a polyacrylate, may be added as a dispersant to 100 parts by mass of calcium carbonate.

The gelling agent can be added to the dispersion medium before, after or concurrently with the addition of calcium carbonate thereto.

(Foaming Agent)

Examples of a foaming agent to be used in the present invention include alkyl sulfate ester salts, such as triethanolamine lauryl sulfate, polyoxyethylene alkyl ether sulfate ester salts, polyoxyethylene alkyl ether acetates, and alkyl polyglucoside.

(Making of Foam)

In the present invention, a foaming agent is added to the above dispersion liquid and the mixture is then stirred until foamy, thus making a foam. The addition of the foaming agent is performed so that the concentration of the foaming agent in the dispersion liquid preferably reaches about 0.01 to about 5% by mass and more preferably reaches about 0.1 to about 3% by mass. The stirring is preferably performed with a handheld mixer, a disperser or the like. When the stirring is performed, the temperature of the dispersion liquid may increase. If necessary, the stirring may be performed with cooling of the dispersion liquid.

(Gelation of Foam)

In the present invention, the made foam is turned into a gel. By turning the foam into a gel, the shape of the foam can be retained during sintering. Examples of the method for turning the foam into a gel include a method of turning the foam into a gel by making a cross-linked structure with calcium ions in the dispersion liquid and a method of accelerating gelation using temperature properties of the gelling agent itself.

The gelled foam is preferably dried to remove at least some moisture in the foam and then sintered. The drying temperature is preferably in a range of 30 to 200° C.

(Sintering of Foam)

In the present invention, a calcium carbonate porous sintered body is produced by sintering the gelled foam. In the present invention, the foam is preferably presintered and then finally sintered. Thus, it can be prevented that organic components contained in the foam remain and become carbonized and darkened or the organic components rapidly decompose to create cracks in the sintered body.

The temperature of the presintering is preferably in a range of 200 to 500° C. and more preferably in a range of 300 to 420° C. The temperature of the final sintering is preferably equal to or greater than the temperature of the presintering and in a range of 420 to 600° C., and more preferably in a range of 450 to 540° C.

Furthermore, the rate of temperature increase during the presintering and the final sintering is preferably in a range of 2° C. to 20° C./min. Thus, it can be prevented that the organic components rapidly decompose to create cracks in the sintered body.

The atmosphere during the sintering is preferably in air. However, the present invention is not limited to this and the foam may be sintered in a carbon dioxide atmosphere or in an atmosphere of inert gas, such as nitrogen gas. According to the present invention, even by sintering in air, a calcium carbonate porous sintered body can be produced.

(Calcium Carbonate Porous Sintered Body)

The porosity of the calcium carbonate porous sintered body according to the present invention is preferably 50% by volume or more, more preferably 60% by volume or more, still more preferably 70% by volume or more, yet still more preferably 80% by volume or more, and particularly preferably 82% by volume or more. Thus, the calcium carbonate porous sintered body also becomes available for biological and like applications. Although no particular limitation is placed on the upper limit of the porosity of the calcium carbonate porous sintered body, it is generally 95% by volume.

In the calcium carbonate porous sintered body according to the present invention, a connected pore leading to the exterior of the sintered body is preferably formed. Thus, calcium carbonate inside the porous sintered body can be easily brought into contact with the external atmosphere. Therefore, the calcium carbonate porous sintered body can be more suitably used, for example, in biological and like applications.

EXAMPLES

Hereinafter, a description will be given of specific examples according to the present invention, but the present invention is not limited to the following examples.

Example 1

(Calcium Carbonate)

Calcium carbonate having a purity of 99.61% by mass, an average particle diameter ($D_{50}$) of 0.15 μm, and a BET specific surface area of 10 m²/g was used. The average particle diameter ($D_{50}$) was determined by measuring the particle diameters of 1500 particles of calcium carbonate, which is an object to be measured, by transmission electron microscopy observation and using the obtained particle diameter distribution. The BET specific surface area was measured by the single point method using FlowSorb 2200 manufactured by Shimadzu Corporation. The purity was derived by the difference method. Specifically, the respective amounts of impurities in a sample liquid for measurement in which a sample of known mass was dissolved were measured with an inductively coupled plasma emission spectrometer, the sum of the measurement results was considered as the content of impurities, and a value obtained by subtracting the content of impurities from the total mass was defined as the purity.

Using the above-described calcium carbonate, a calcium carbonate porous sintered body was produced in the following manner.

(Preparation of Dispersion Liquid)

An amount of 55 parts by mass of ion-exchange water, 100 parts by mass of calcium carbonate, 0.55 parts by mass of methylcellulose, 2.5 parts by mass of special polycarboxylate polymer type surfactant (effective number of parts: 1.0 parts by mass), 0.32 parts by mass of potassium carbonate, and 0.28 parts by mass of lithium carbonate were mixed with a homogenizer-disperser, thus obtaining a dispersion liquid. Methylcellulose is a gelling agent, the special carboxylate polymer type surfactant is a dispersant, and potassium carbonate and lithium carbonate are sintering aids.

(Making of Foam)

An amount of 0.97 parts by mass (effective number of parts: 0.39 parts by mass) of triethanolamine lauryl sulfate as a foaming agent was added into the obtained dispersion liquid and the mixture was stirred until foamy at 1000 rpm for 10 minutes with a handheld mixer, thus making a foam.

(Gelation of Foam)

The foam was put into a forming mold made by paper, the forming mold was moved into a hot-air dryer, and the foam was heated at 80° C. for 0.5 hours in the hot-air dryer to turn the foam into a gel. The gelled foam was heated at 80° C. for 12 hours to dry it.

(Sintering of Foam)

The gelled and dried foam was increased in temperature at a rate of 5° C./min until a presintering temperature (400° C.) and presintered for 10 hours after the temperature increase. Next, the foam was increased in temperature at the same rate of temperature increase from 400° C. until a final sintering temperature (510° C.), finally sintered for three hours after the temperature increase, and then cooled at a rate of 10° C./min until room temperature, thus obtaining a calcium carbonate porous sintered body.

The porosity of the obtained calcium carbonate porous sintered body was 82% by volume. The porosity was obtained by cutting the sintered body into a rectangular block, determining the density of the block from the weight and apparent volume of the block, dividing the density by the true density of calcium carbonate, 2.711 g/cm³, to obtain a relative density (%), and defining as the porosity a value obtained by subtracting the relative density from 100%.

Example 2

A foam was made in the same manner as in Example 1 except that the amount of foaming agent was changed from 0.97 parts by mass to 0.04 parts by mass, and the made foam was turned into a gel and sintered, thus obtaining a calcium carbonate porous sintered body. The porosity of the obtained calcium carbonate porous sintered body was 64% by volume.

Example 3

A foam was made in the same manner as in Example 1 except that an alkaline water-soluble copolymer of isobutylene and maleic anhydride was used as a gelling agent, and the made foam was turned into a gel and sintered, thus obtaining a calcium carbonate porous sintered body. The porosity of the obtained calcium carbonate porous sintered body was 78% by volume.

Comparative Example 1

A foam was made in the same manner as in Example 1 except that no gelling agent was used, and the made foam was turned into a gel and sintered. However, the shape of the foam could not be retained during sintering, resulting in failure to obtain a calcium carbonate porous sintered body.

<Scanning Electron Microscope Observation of Calcium Carbonate Porous Sintered Body>

FIGS. 1 to 4 are scanning electron micrographs of the calcium carbonate porous sintered body obtained in Example 1. FIG. 1 is a micrograph at 25-fold magnification, FIG. 2 is one at 150-fold magnification, FIG. 3 is one at 5000-fold magnification, and FIG. 4 is one at 20000-fold magnification. As is obvious from FIGS. 1 and 2, it can be seen that the calcium carbonate porous sintered body had connected pores leading to the exterior of the sintered body. Furthermore, as is obvious from FIGS. 3 and 4, it can be seen that calcium carbonate particles were densely sintered to form a porous sintered body with a dense wall.

Example 4

A foam was made in the same manner as in Example 1 except that calcium carbonate having a purity of 99.99% by mass, an average particle diameter ($D_{50}$) of 0.15 μm, and a BET specific surface area of 10 $m^2/g$ was used and neither potassium carbonate nor lithium carbonate as sintering aids were added into the dispersion liquid, and the made foam was turned into a gel and sintered, thus obtaining a calcium carbonate porous sintered body. The porosity of the obtained calcium carbonate porous sintered body was 84% by volume.

Example 5

A foam was made in the same manner as in Example 1 except that calcium carbonate having a purity of 99.91% by mass, an average particle diameter ($D_{50}$) of 0.15 μm, and a BET specific surface area of 10 $m^2/g$ was used and neither potassium carbonate nor lithium carbonate as sintering aids were added into the dispersion liquid, and the made foam was turned into a gel and sintered, thus obtaining a calcium carbonate porous sintered body. The porosity of the obtained calcium carbonate porous sintered body was 81% by volume.

Reference Example 1

A foam was made in the same manner as in Example 1 except that neither potassium carbonate nor lithium carbonate as sintering aids were added into the dispersion liquid, and the made foam was turned into a gel and sintered, but a calcium carbonate porous sintered body could not be obtained.

Comparison of Examples 4 and 5 with Reference Example 1 shows that, with the use of high-purity calcium carbonate, a calcium carbonate porous sintered body can be produced without using any sintering aid.

The invention claimed is:

1. A method for producing a calcium carbonate porous sintered body, the method comprising the steps of:
   preparing a dispersion liquid containing calcium carbonate and a gelling agent;
   adding a foaming agent to the dispersion liquid, followed by stirring until foamy to make a foam;
   turning the foam into a gel; and
   sintering the gelled foam to produce a calcium carbonate porous sintered body.

2. The method for producing a calcium carbonate porous sintered body according to claim 1, wherein the dispersion liquid contains a sintering aid.

3. The method for producing a calcium carbonate porous sintered body according to claim 2, wherein the sintering aid contains carbonates or fluorides of at least two of lithium, sodium, and potassium and has a melting point of 600° C. or below.

4. The method for producing a calcium carbonate porous sintered body according to claim 1, wherein the dispersion liquid contains the calcium carbonate in an amount of 20% by volume or more.

5. The method for producing a calcium carbonate porous sintered body according to claim 1, wherein the step of sintering is the step of performing presintering and then performing final sintering.

6. The method for producing a calcium carbonate porous sintered body according to claim 5, wherein a temperature of the presintering is in a range of 200 to 500° C. and a temperature of the final sintering is equal to or greater than the temperature of the presintering and in a range of 420 to 600° C.

7. The method for producing a calcium carbonate porous sintered body according to claim 1, wherein the calcium carbonate has an average particle diameter ($D_{50}$) in a range of 0.05 to 0.30 μm in a particle diameter distribution measured by transmission electron microscope observation.

8. The method for producing a calcium carbonate porous sintered body according to claim 1, wherein the calcium carbonate has a BET specific surface area of 5 to 25 $m^2/g$.

9. The method for producing a calcium carbonate porous sintered body according to claim 1, wherein the calcium carbonate has a purity of 99.9% by mass or more.

10. The method for producing a calcium carbonate porous sintered body according to claim 1, wherein the turning of the foam into gel comprises heating the foam at a temperature sufficient to cause gelation.

* * * * *